(12) United States Patent
Fu et al.

(10) Patent No.: US 12,337,459 B2
(45) Date of Patent: Jun. 24, 2025

(54) RAPID ASSEMBLY TYPE TOOL ROD CONNECTION STRUCTURE

(71) Applicant: Tangshan Changzhi Agricultural Tools Design Manufacturing Co., Ltd., Tangshan (CN)

(72) Inventors: Changzhi Fu, Tangshan (CN); Xiaolin Fu, Tangshan (CN); Chun Li, Tangshan (CN)

(73) Assignee: Tangshan Changzhi Agricultural Tools Design Manufacturing Co., Ltd., Tangshan (CN)

( * ) Notice: Subject to any disclaimer, the term of this patent is extended or adjusted under 35 U.S.C. 154(b) by 818 days.

(21) Appl. No.: 17/407,817

(22) Filed: Aug. 20, 2021

(65) Prior Publication Data

US 2023/0029516 A1 Feb. 2, 2023

(30) Foreign Application Priority Data

Jul. 30, 2021 (CN) .......................... 202110870570.6

(51) Int. Cl.
B25G 1/04 (2006.01)
B25G 3/00 (2006.01)

(52) U.S. Cl.
CPC ................. *B25G 1/04* (2013.01); *B25G 3/00* (2013.01)

(58) Field of Classification Search
CPC ... B25G 1/04; B25G 3/38; B25G 3/12; B25G 3/04; B25G 3/00; B25G 1/10; B25G 1/06; B25G 1/046; B25G 1/043; B25G 1/00
USPC .......................................... 81/489
See application file for complete search history.

(56) References Cited

U.S. PATENT DOCUMENTS

| | | | | |
|---|---|---|---|---|
| 6,045,284 | A * | 4/2000 | Chiu ........................ | B25G 1/04 285/302 |
| 2014/0366327 | A1* | 12/2014 | Huang ..................... | B25G 1/10 16/421 |
| 2020/0384328 | A1* | 12/2020 | Chua ....................... | A63B 60/28 |

* cited by examiner

*Primary Examiner* — Katina N. Henson

(57) ABSTRACT

A rapid assembly type tool rod connection structure comprising an outer sleeve, an inner sleeve and a fastening sleeve, wherein, the fastening sleeve is connected with the outer sleeve; the inner sleeve is sheathed inside of the outer sleeve, a reinforced limiting component is provided between the inner sleeve and the fastening sleeve, which is connected to the inner sleeve and the fastening sleeve to limit the inner sleeve and the fastening sleeve.

10 Claims, 8 Drawing Sheets

RAPID ASSEMBLY TYPE TOOL ROD CONNECTION STRUCTURE

CROSS-REFERENCE TO RELATED APPLICATIONS

This application claims priority to Chinese Application No. 202110870570.6, filed on Jul. 30, 2021, entitled "automatic jet breaking tool for solid fluidization exploitation of natural gas hydrate". These contents are hereby incorporated by reference.

TECHNICAL FIELD

The present invention relates to a rod connection structure, and specifically relates to a rapid assembly type tool rod connection structure.

BACKGROUND

At present, there are various rod connection methods for a hand tool. In order to facilitate storage and transportation, a telescopic or a detachable and assembled rod is attracting more and more interests from the consumers, since this kind of tool rod covers a small area and is convenient for assembly and replacement.

However, among various assembled tools, the connection and fixation between most of the rods still needs to be fulfilled by an additional connector such as a bolt etc. to ensure its stability and use strength. In the assembly process, an additional connection such as a screw bolt also requires the user to operate on the spot. If the user is women or people lacking strength, this connection method still cannot realize the purposes of fast installation and easy assembly etc., and the operator is often confused about the operation sequence of loosening a fastening sleeve and loosening a rod during unloading, which causes a damage on the connection member and in turn hinders the assembly and usage of tools. Therefore, the connection structure capable of assembling a rod assembly without an additional connector becomes a new solution being studied and explored by the tool manufacturers.

SUMMARY OF THE INVENTION

The present invention provides a rapid assembly type tool rod connection structure directed to the technical defect mentioned in the "background" part herein.

The technical solution used in the present invention is a rapid assembly type tool rod connection structure comprising an outer sleeve, an inner sleeve and a fastening sleeve, wherein, the fastening sleeve is connected with the outer sleeve; the inner sleeve is sheathed inside of the outer sleeve, a reinforced limiting component is provided between the inner sleeve and the fastening sleeve, which is connected to the inner sleeve and the fastening sleeve to limit the inner sleeve and the fastening sleeve.

As a preferred technical solution, the reinforced limiting component is connected to the inner sleeve and the fastening sleeve and is arranged to extend along the axis of the inner sleeve so that the axis of the inner sleeve and the axis of the fastening sleeve are in the same line.

As a preferred technical solution, the inner sleeve is provided with a supporting end; the reinforced limiting component comprises a metal tube and a connecting tube; the supporting end abuts one end portion of the metal tube and carries the metal tube, the other end of the metal tube is plug-in mounted into the connecting tube and is connected to the fastening sleeve via the connecting tube.

As a preferred technical solution, the end of the fastening sleeve is provided with an annular end surface, via which the limiting sleeve is limited.

As a preferred embodiment, one end of the inner sleeve is a tapered tube which gradually enters a receiving cavity of the inner sleeve from the outside to the inside, and is installed with the inner wall of the outer sleeve in a guided manner.

As a preferred technical solution, the tapered tube is engaged with the outer sleeve.

As a preferred technical solution, the inner sleeve is provided with a hollow cylindrical tube and the outer diameter of the tapered tube is larger than the outer diameter of the hollow cylindrical tube, which forms a step surface for holding the metal tube.

As a preferred technical solution, the rapid assembly type tool rod connection structure is used to connect the rod with the tool head; the outer surface of the outer sleeve is a tapered structure that matches the connecting portion of the tool head.

As a preferred technical solution, the reinforced limiting component comprises a metal tube, a limiting tube, a limiting sleeve and a positioning pin; one end of the metal tube is sheathed inside the inner sleeve and the other end is sheathed in the limiting tube; the limiting sleeve is sheathed outside of the limiting tube and is plug-in mounted via the positioning pin to achieve a detachable positioning connection between the limiting sleeve and the limiting tube.

As a preferred technical solution, limiting teeth that match each other are arranged on the outer wall of the limiting tube and the inner wall of the limiting sleeve, to realize the circumferential positioning between the outer wall of the limiting tube and the inner wall of the limit sleeve.

As a preferred technical solution, the positioning pin comprises two pins in a cross-shaped setting, which realizes the fixation among the metal tube, the limiting tube and the limiting sleeve.

As a preferred technical solution, the rapid assembly type tool rod connection structure is used to connect the rod with the rod; it further comprises a connecting tube; the free ends of both the outer sleeve and the connecting tube are cylindrical tubes.

As a preferred technical solution, the reinforced limit component is processed into an integrated member, which is assembled as an integral after being plug-in mounted and connected with the outer sleeve and the fastening sleeve.

Compared with the prior art, the rapid assembly type tool rod connection structure disclosed in the present invention comprises an outer sleeve, an inner sleeve and a fastening sleeve, wherein the fastening sleeve is connected to the outer sleeve, the inner sleeve is sheathed inside the outer sleeve, a reinforced limiting component is arranged between the inner sleeve and the fastening sleeve and is connected to the inner sleeve and the fastening sleeve to limit the inner sleeve and the fastening sleeve and improve the accuracy and convenience of connecting the inner sleeve axis with the fastening sleeve, thereby realizing the rapid connection and mounting between the tool rod and the tool head and between the tool rod and the tool rod, therefore the connection and complete assembling of rod members could be achieved through simple threaded screwing, the operation which is easy, convenient and fast.

LIST

Figure 1:
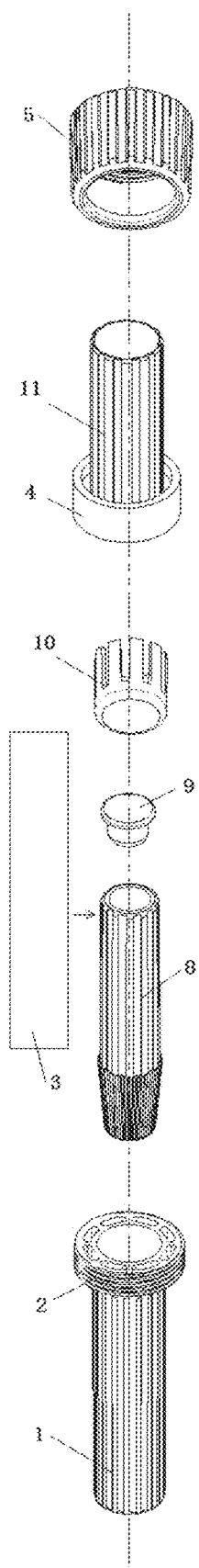
FIG. 1 is a schematic structural view of Embodiment I in the present invention.

In the Figures:
1 outer sleeve
2 connecting head
3 metal tube
4 limiting sleeve
5 fastening sleeve
6 limiting tube
7 positioning pin
8 inner sleeve
9 first plug
10 second plug

DETAILED DESCRIPTION OF PREFERRED EMBODIMENTS

The invention will be further described below with reference to the accompanying drawings and embodiments.

Figure 2:
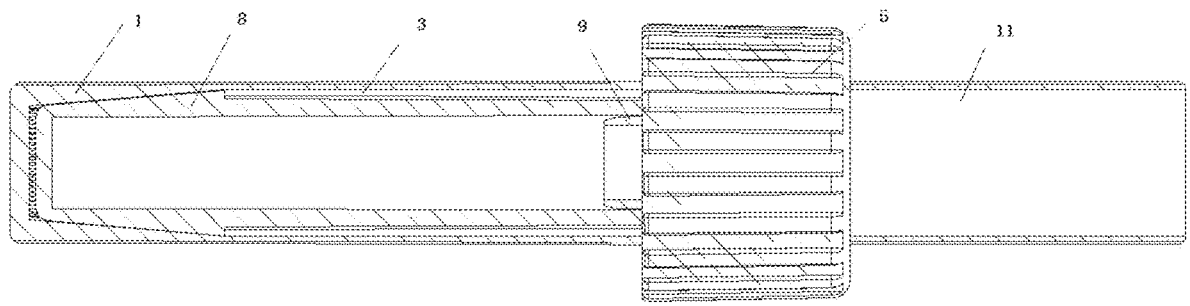
FIG. 2 is a schematic view of the connection structure of Embodiment I in the present invention after assembling.
Figure 3:
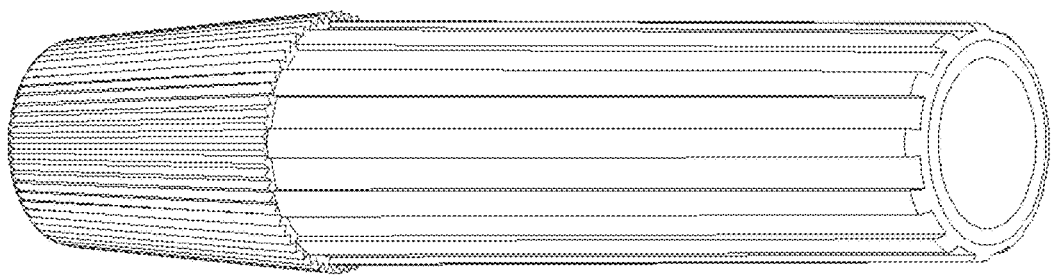
FIG. 3 is a schematic structural view of the inner sleeve of Embodiment I.
Figure 4:
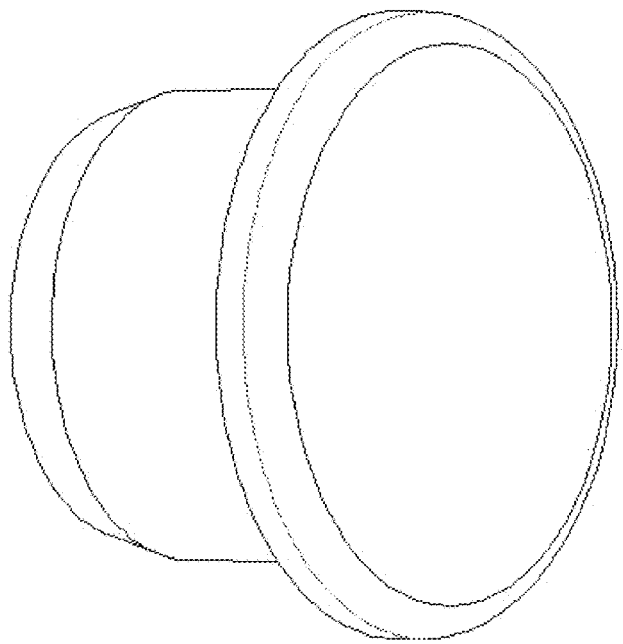
FIG. 4 is a schematic structural view of the first plug of Embodiment I.
Figure 5:
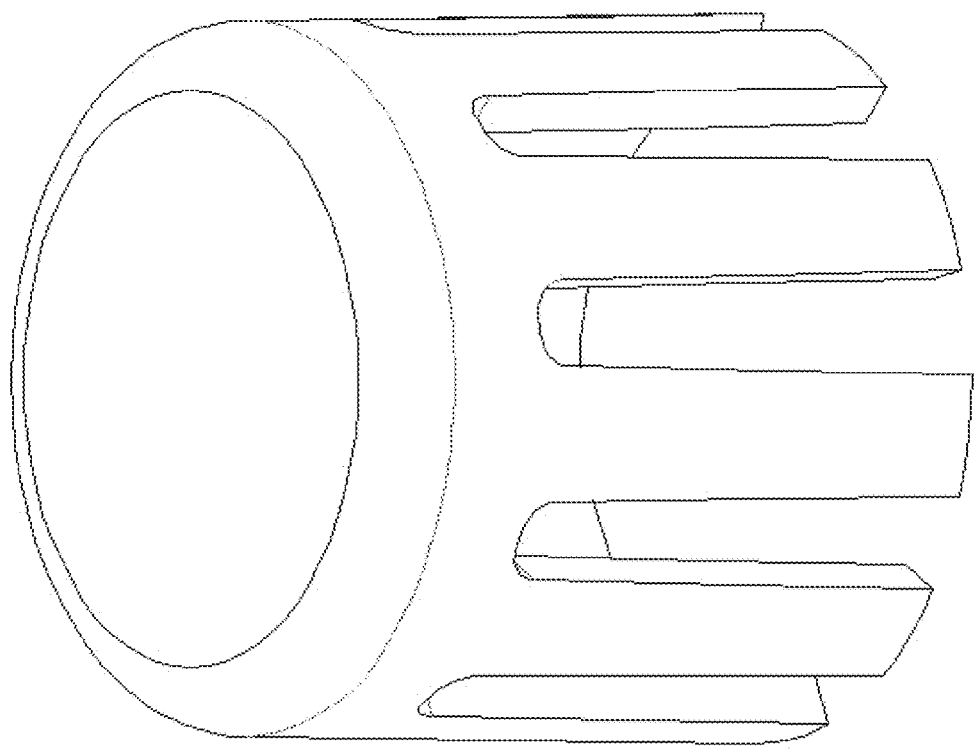
FIG. 5 is a schematic structural view of the second plug of Embodiment I.
Figure 6:
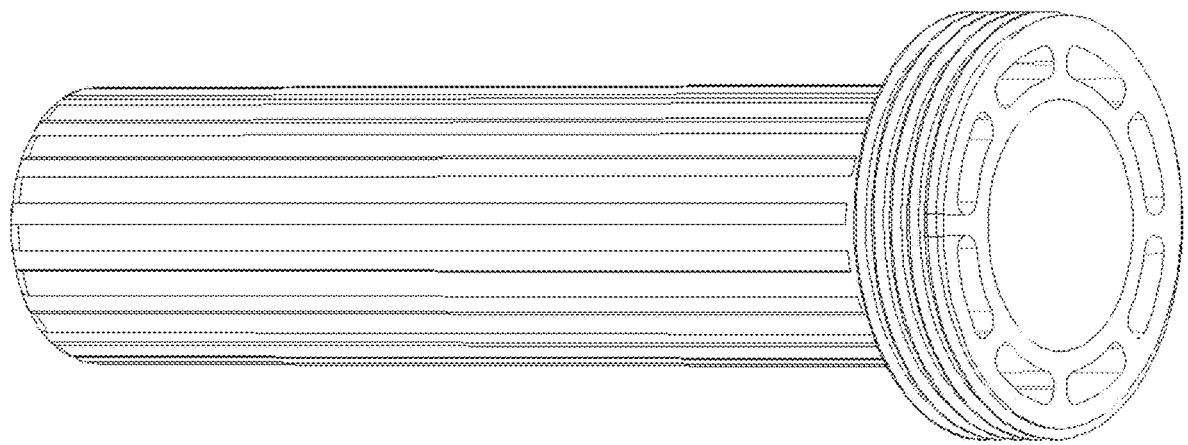
FIG. 6 is a schematic structural view of the outer sleeve of Embodiment I.
Figure 7:
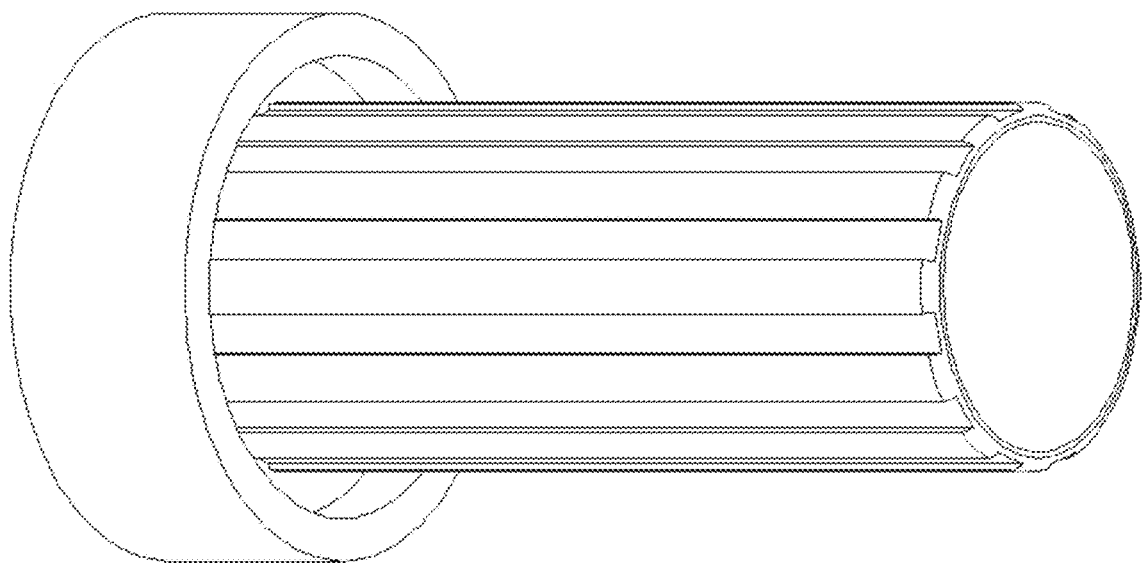
FIG. 7 is a schematic structural view of the connecting tube of Embodiment I.
Figure 8:
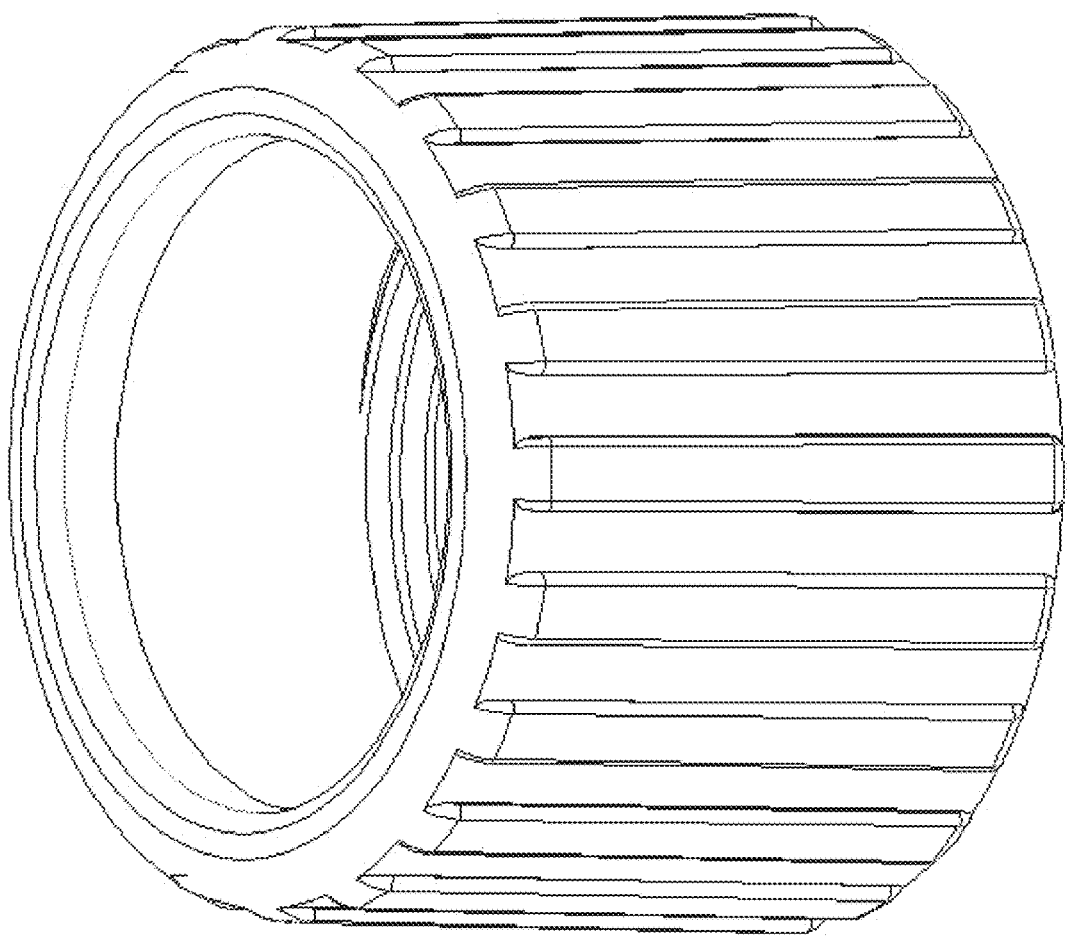
FIG. 8 is a schematic structural view of the fastening sleeve of Embodiment I.
Figure 9:
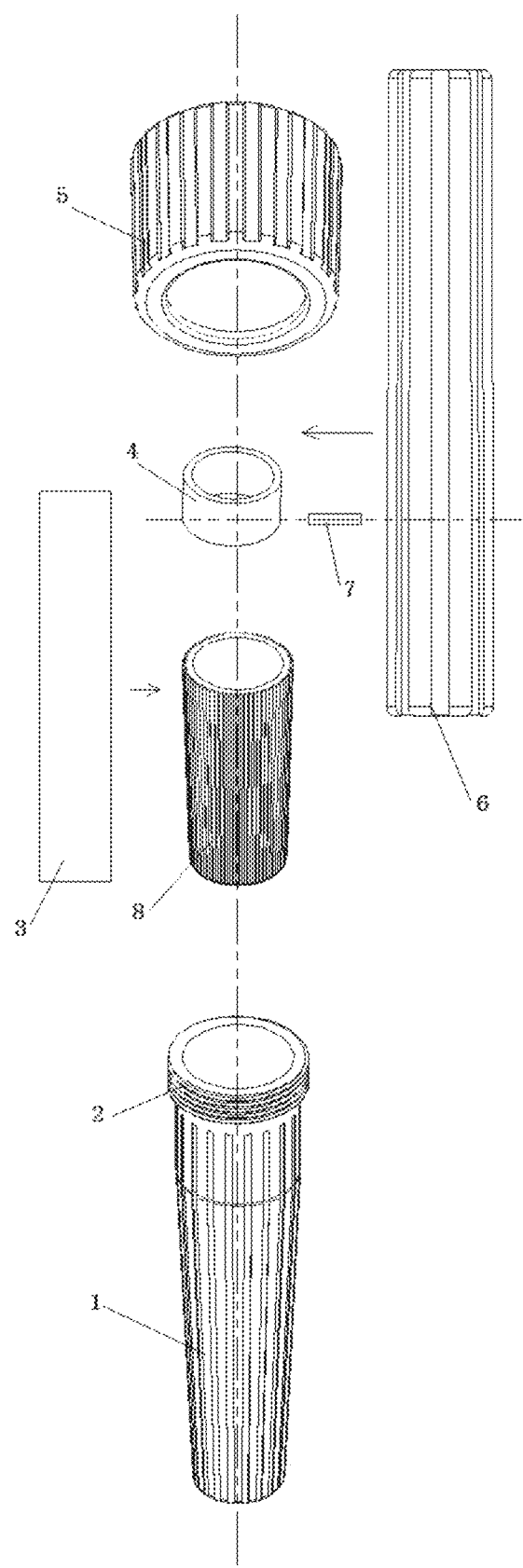
FIG. 9 is a schematic structural view of Embodiment II in the present invention.
Figure 10:
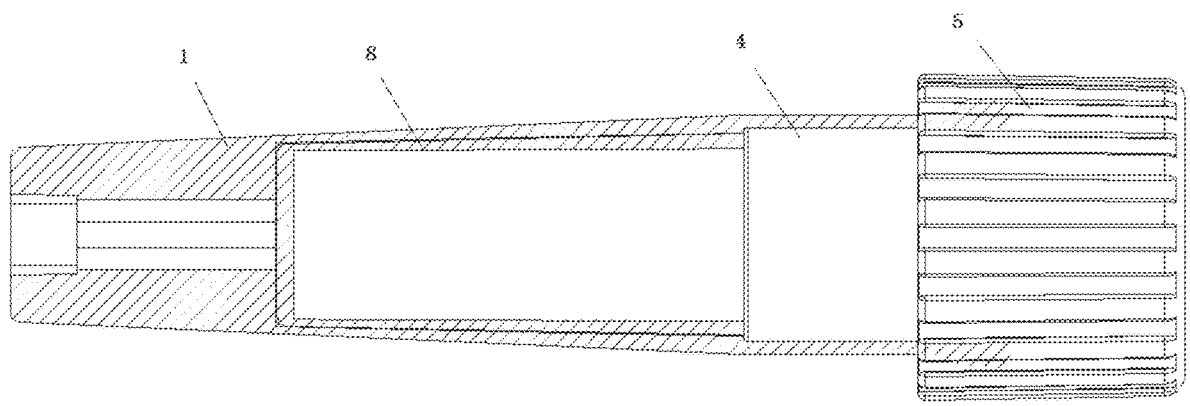
FIG. 10 is a schematic view of the connection structure of Embodiment II in the present invention after assembling.
Figure 11:
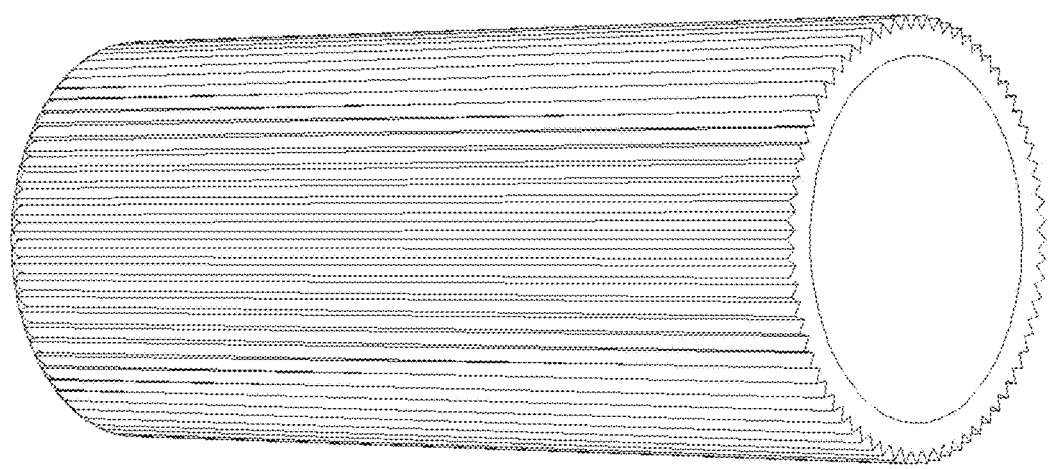
FIG. 11 is a schematic structural view of the inner sleeve of Embodiment II.
Figure 12:
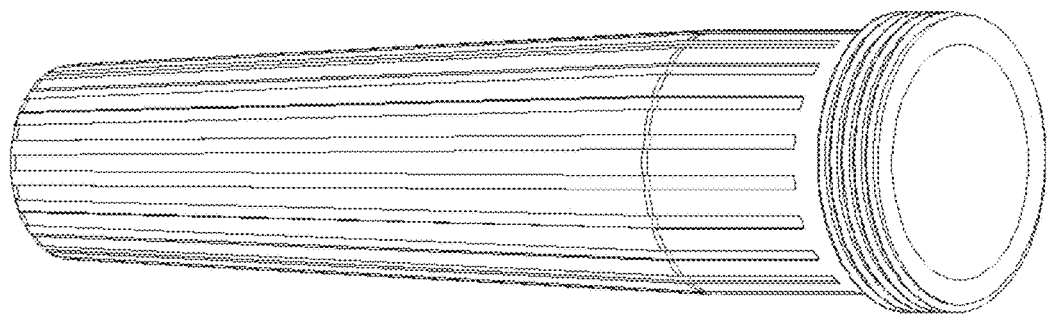
FIG. 12 is a schematic structural view of the outer sleeve of Embodiment II.
Figure 13:
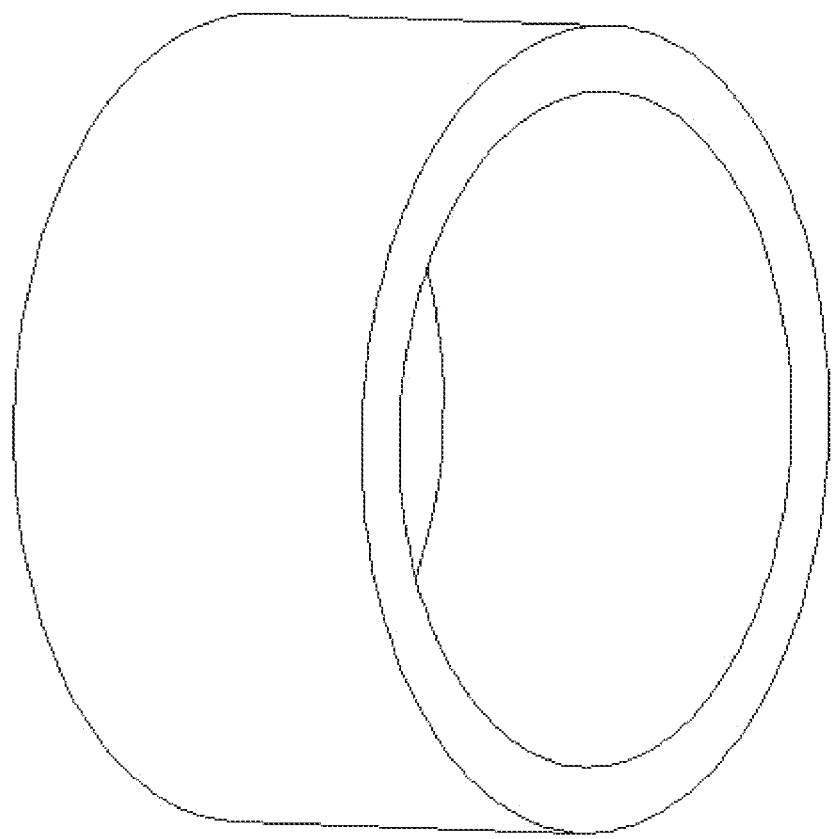
FIG. 13 is a schematic structural view of the limiting sleeve of Embodiment II.
Figure 14:
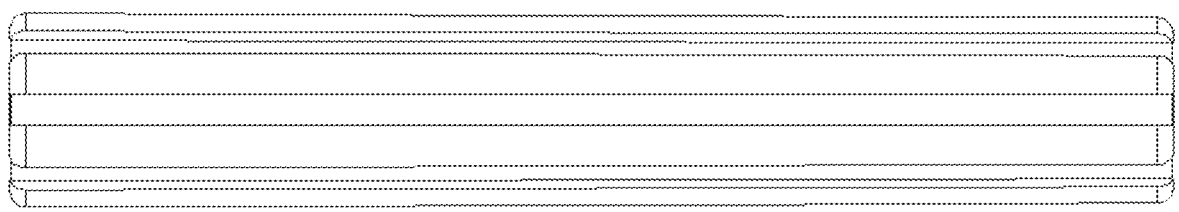
FIG. 14 is a schematic structural view of the limiting tube of Embodiment II.
Figure 15:
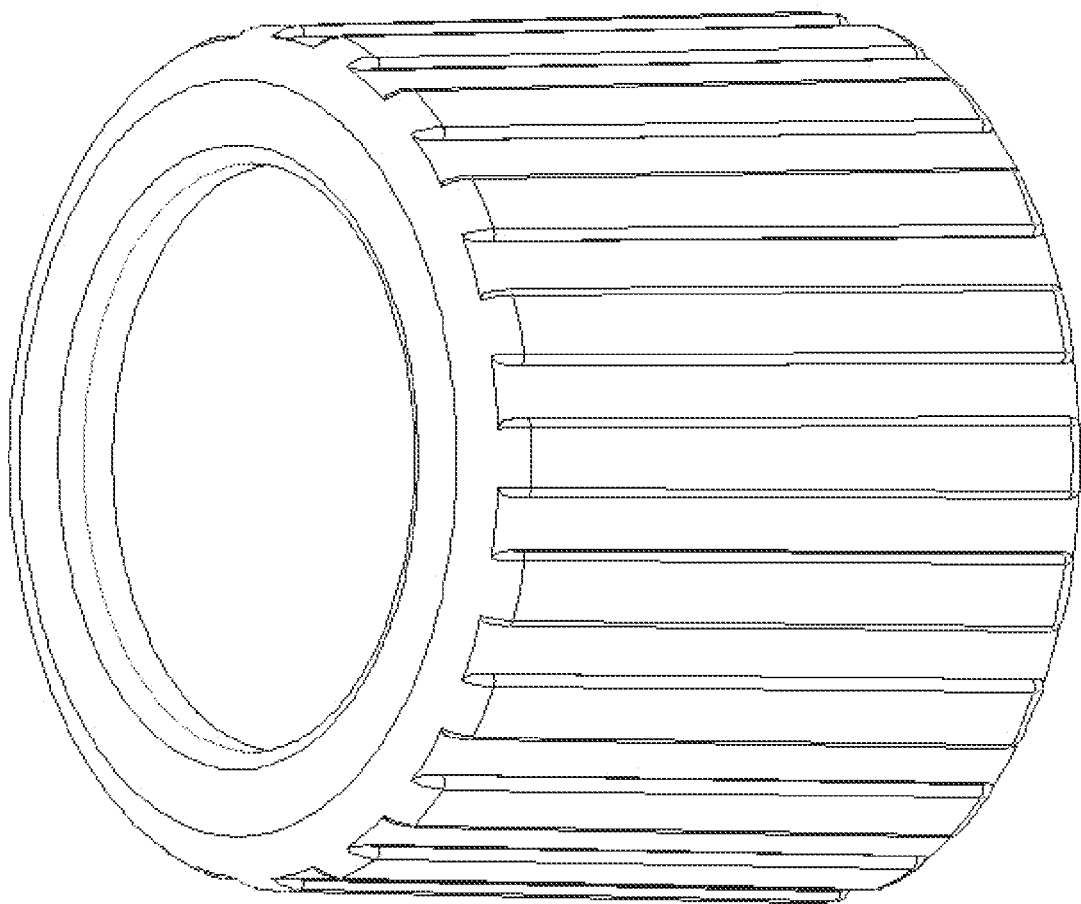
FIG. 15 is a schematic structural view of the fastening sleeve of Embodiment II.

With reference to FIGS. 1-15, the rapid assembly type tool rod connection structure disclosed in the present invention is applied in a rapid assembly and connection between the tool rod and the tool head and/or between the tool rod and the tool rod, of hand tools. The rapid assembly type tool rod connection structure comprises an outer sleeve 1, an inner sleeve 8, a reinforced limiting component, a fastening sleeve 5, a first plug 9 and a second plug 10.

The inner sleeve 8 is sheathed inside the outer sleeve 1 and is detachable with the outer sleeve 1, wherein inside of the outer sleeve 1 there is provided with a receiving cavity, and the inner sleeve 8 is mounted in the receiving cavity and is sheathed the outer sleeve 1 along the extending direction of the receiving cavity, whose outside is protected by the outer sleeve 1, thereby realizing a hidden design.

A reinforced limiting component that realizes a reinforced connecting and limiting function is arranged between the inner sleeve 8 and the fastening sleeve 5. The reinforced limiting component is connected to the inner sleeve 8 and the fastening sleeve 5 and extends along the axis of the inner sleeve 8, which allows the axis of the inner sleeve 8 and the axis of the fastening sleeve 5 to be in the same line, and the accuracy and convenience of connecting the axis of the inner sleeve 8 and the fastening sleeve 5 to be improved.

Wherein, the reinforced limiting component can be processed into an integrated member or can be assembled from a plurality of elements; the reinforced limiting component is connected to the outer sleeve 8 and the fastening sleeve 5, and realizes the fastening between the outer sleeve 8 and the fastening sleeve 5 to realize the integral design of the reinforced limiting component, the outer sleeve 8 and the fastening sleeve 5, which means the reinforced limiting component, the outer sleeve 8 and the fastening sleeve 5 are assembled as an integral after connection, thereby realizing an integral installation and replacement of the rapid assembly type tool rod connection structure.

The fastening sleeve 5 is in thread connection with the outer sleeve 1 and designed to be detachable with the outer sleeve 1, wherein the fastening sleeve 5 is connected to the end portion of the outer sleeve 1 and caps the inner sleeve 8.

The technical solutions disclosed in the present invention will be detailed below with specific embodiments.

Embodiment I

The rapid assembly type tool rod connection structure is used to connect a rod with another rod and realize the assembly and replacement between one rod and another rod.

The rapid assembly type tool rod connection structure also comprises a connecting tube 11, which is arranged coaxially with the outer sleeve 1 and is plug-in mounted in the outer sleeve 1. Optionally, the free ends of both the outer sleeve 1 and the connecting tube 11 are cylindrical tubes. The length of the outer sleeve 1 and the connecting tube 11 are adjusted according to actual demands so as to match with tools with different length requirements, wherein, the connecting tube 11 and the outer sleeve 1 are on the two ends of the rapid assembly type tool rod connection structure and are respectively connect one rod with to another rod, to achieve the assembly and disassembly between one rod and another rob.

Optionally, a rod is arranged adjacent to another rod, both of which extend along the same axis. The two adjacent rods are connected by the rapid assembly type tool rod connection structure. The outer portions of the connecting tube 11 and the outer sleeve 1 are configured according to demands on the actual rod length or is connected with the rod by the method of adhering or injection molding, and its specific structures can be referred to FIGS. 1-8.

In this embodiment, the reinforced limiting component comprises a metal tube 3 and a connecting tube 11. The metal tube 3 is arranged between the outer sleeve 1 and the inner sleeve 8 and sheathes the inner sleeve 8. A supporting end is arranged on the inner sleeve 8 and this supporting end abuts one end portion of the metal tube 3 and carries the metal tube 3, the other end of the metal tube 3 is inserted into the connecting tube 11; the connecting tube 11 whose inside is provided with the metal tube 3 therein is connected to the fastening sleeve 5. The end of the outer sleeve 1 extends outwardly to form the connecting head 2. The connecting head 2 is in thread connection with the fastening sleeve 5, which achieves the assembly and disassembly between the connecting head 2 and the fastening sleeve 5.

As a preferred embodiment, one end of the connecting tube 11 is configured with a limiting sleeve 4, the two of which can be made into an integral by injection molding or can be a split structure connected through a connecting member. The limiting sleeve 4 is used in conjunction with the fastening sleeve 5. The end portion of the fastening sleeve 5 is configured with a annular end surface, which functions to limit the limiting sleeve 4 and achieves the axial positioning, thereby realizing anti-bias design for the limiting sleeve 4 during the assembly process.

As another preferred embodiment, one end of the inner sleeve 8 is a tapered tube, which gradually enters the receiving cavity from the outside to the inside and is installed with the inner wall of the outer sleeve 1 in a guided manner. The peripheral side of the tapered tube is assembled with the inner wall of the outer sleeve 1 in a sliding manner, wherein the other end of the inner sleeve 8 is a hollow cylindrical tube and the metal tube 3 is sheathed outside the hollow cylindrical tube.

Further, the outer wall of the tapered tube is configured with teeth that match the inner wall of the outer sleeve 1. After the inner sleeve 8 and the outer sleeve 1 are docked, the tapered tube is engaged with the inner wall of the outer sleeve 1 through the teeth, thereby restricting the axial rotation of the tapered tube, which ensures the circumferential positioning between the inner sleeve 8 and the outer sleeve 1, thereby improving the stability and convenience of assembling the rapid assembly type tool rod connection structure.

Preferably, the outer diameter of the tapered tube is greater than the outer diameter of the hollow cylindrical tube. A table facet is formed where the tapered tube and the hollow cylindrical tube are jointed and there exists a gap along the axial extension direction of the tapered tube and the hollow cylindrical tube to form a step face, thereby facilitating to hold the metal tube 3, wherein the end face of the metal tube 3 sticks close to the step face.

As a preferred embodiment, the metal tube 3 and the inner sleeve 8 are fixed by adhesion or injection molding; the metal tube 3 and the connecting tube 11 are fixed by adhesion or injection molding.

Embodiment II

The rapid assembly type tool rod connection structure is used to connect a rod with a tool head. The outer surface of the outer sleeve 1 is a tapered structure that matches the connecting portion of the tool head, which can be referred to FIGS. 9-15.

In this embodiment, the reinforced limiting component comprises a metal tube 3, a limiting tube 6, a limiting sleeve 4, and a positioning pin 7.

The metal tube 3 is a hollow cylindrical tube, one end of which is sheathed in the inner sleeve 8, while the other end is sheathed with the limiting tube 6; the limiting sleeve 4 is sheathed outside the limiting tube 6, and is plug-in mounted through a positioning pin, which realizes a detachable positioning connection between the limiting sleeve 4 and the limiting tube 6. In this embodiment, the limiting tube 6 and the limiting sleeve 4 are split structures, and preferably limiting tooth that match each other are configured on the outer wall of the limiting tube 6 and the inner wall of the limit sleeve 4 to realize the circumferential positioning between the outer wall of the limiting tube 6 and the inner wall of the limit sleeve 4, thereby preventing circumferential rotation of the limiting tube 6 and the limiting sleeve 4 during assembling, thereby improving the stability and convenience of assembling the rapid assembly type tool rod connection structure. Alternatively, the limiting tube 6 and the limiting sleeve 4 can also be an integral structure by injection molding.

The limit sleeve 4 is used in conjunction with the fastening sleeve 5, and the end portion of the fastening sleeve 5 is provided with a annular end surface which functions to limit the limiting sleeve 4, achieve the axial positioning and the anti-bias design of the limiting sleeve 4 during the assembly process, wherein the length of the limit sleeve can be adjusted according to the actual application conditions so as to meet demands on rods of different lengths. The limiting tube 6 with a limiting sleeve 4 is inserted into the fastening sleeve 5. The inner sleeve 8 whose inside is configured with a metal tube 3 is inserted into the outer sleeve 1. The connecting head 2 of the outer sleeve is in thread connection with the fastening sleeve 5.

As a preferred embodiment, the metal tube 3 is fixed with the inner sleeve 8 by adhesive; the outer sleeve 1 is fixed with the connecting portion of a tool head by adhesive or injection molding. Or, the outer sleeve 1 is fixed with the connecting portion of a tool head by a bolt. The inner wall of the end portion in the outer sleeve 1 is configured with threaded inner holes and the connecting portion thereof is configured with protruding studs, wherein the inner hole and the stud are fixed by screwing with thread.

As a preferred embodiment, the outer wall of the inner sleeve 8 is configured with first teeth used for positioning. The inner wall of the outer sleeve 1 is configured with second teeth matching the first teeth. The second tooth and the first tooth are mutually engaged to achieve the circumferential positioning. The first teeth can be arranged throughout the entire outer wall of the inner sleeve or the first teeth are only arranged on ½-⅓ of the outer wall of the inner sleeve 1.

As a preferred embodiment, the positioning pin 7 comprises two pins in a cross-shaped setting, which realizes the fixation among the metal tube 3, the limiting tube 6, and the limiting sleeve 4.

Either the tool head and the tool rod, or the tool rod and the tool rod, are all fixed and connected by a reinforced component, with the rod in a separate place; the outer sleeve 1 and the connecting tube 11, where needed, respectively act as the free end of adjacent rods and are connected together by a reinforced limiting component to achieve a rapid assembly connection for tool rods. Or, a rod with a concrete length determined according to the actual demands on rod length is directly secured to the outer wall of the outer sleeve 1 or the connecting tube 11 by adhesion or injection molding.

What is claimed is:

1. A rapid assembly tool rod connection structure, comprising an outer sleeve, an inner sleeve and a fastening sleeve, wherein, the fastening sleeve is connected with the outer sleeve; the inner sleeve is sheathed inside of the outer sleeve, a reinforced limiting component is provided between the inner sleeve and the fastening sleeve, which is connected to the inner sleeve and the fastening sleeve to limit the inner sleeve and the fastening sleeve;

wherein the reinforced limiting component comprises a metal tube, a limiting tube, a limiting sleeve and a positioning pin;

one end of the metal tube is sheathed inside the inner sleeve and another end of the metal tube is sheathed in the limiting tube; the limiting sleeve is sheathed outside of the limiting tube and is plug-in mounted via the positioning pin to achieve a detachable positioning connection between the limiting sleeve and the limiting tube.

2. The rapid assembly tool rod connection structure according to claim 1, wherein the reinforced limiting component is connected to the inner sleeve and the fastening sleeve and is arranged to extend along an axis of the inner sleeve so that the axis of the inner sleeve and an axis of the fastening sleeve are in the same line.

3. The rapid assembly tool rod connection structure according to claim 1, wherein the end of the fastening sleeve is provided with an annular end surface, via which the limiting sleeve is limited.

4. The rapid assembly tool rod connection structure according to claim 3, wherein the one end of the inner sleeve is a tapered tube, and the inner sleeve is installed with an inner wall of the outer sleeve in a guided manner.

5. The rapid assembly tool rod connection structure according to claim 4, wherein the tapered tube is engaged with the outer sleeve.

6. The rapid assembly tool rod connection structure according to claim 4, wherein the inner sleeve is provided with a hollow cylindrical tube and the outer diameter of the tapered tube is larger than the outer diameter of the hollow cylindrical tube, which forms a step surface for holding the metal tube.

7. The rapid assembly tool rod connection structure according to claim 1, wherein the rapid assembly tool rod connection structure is used to connect a rod with a tool head; the outer surface of the outer sleeve is a tapered structure that matches a connecting portion of the tool head.

8. The rapid assembly tool rod connection structure according to claim 1, wherein limiting teeth that match each other are arranged on the outer wall of the limiting tube and the inner wall of the limiting sleeve, to realize a circumferential positioning between the outer wall of the limiting tube and the inner wall of the limit sleeve.

9. The rapid assembly tool rod connection structure according to claim 8, wherein the positioning pin comprises two pins in a cross-shaped setting, which realizes the fixation among the metal tube, the limiting tube and the limiting sleeve.

10. The rapid assembly tool rod connection structure according to claim 1, wherein the reinforced limit component is processed into an integrated member, which is assembled as an integral after being plug-in mounted and connected with the outer sleeve and the fastening sleeve.

* * * * *